United States Patent Office 3,817,836
Patented June 18, 1974

3,817,836
METHOD OF PREPARING MACROLIDE ANTIBIOTICS

Robert John Theriault, Kenosha, Wis., and Earl Elmer Fager, Lake Villa, Ill., assignors to Abbott Laboratories, Chicago, Ill.
No Drawing. Filed May 30, 1972, Ser. No. 257,630
Int. Cl. C12d 9/00
U.S. Cl. 195—80 R                    5 Claims

ABSTRACT OF THE DISCLOSURE

A microbial conversion method of preparing 9-dihydroniddamycin from niddamycin or 9-dihydrocarbomycin A from carbomycin A (magnamycin A) comprising the steps of inoculating *Streptomyces albireticuli* NRRLB 1670 or *Streptomyces eurocidicus* NRRLB 1676 cultures into a fermentation medium, incubating for sufficient time to allow growth, adding said niddamycin or carbomycin A substrate to the fermentation, reincubating for sufficient time to permit the microbial conversion of the substrate to take place, and isolating said 9-dihydroniddamycin or said 9-dihydrocarbomycin A.

DESCRIPTION OF THE DISCLOSURE

This invention relates to a method of preparing 9-dihydroniddamycin from a niddamycin substrate or 9-dihydrocarbomycin A from a carbomycin A substrate by adding one of the substrates to either of the cultures *Streptomyces albireticuli* NRRLB 1670 or *Streptomyces eurocidicus* NRRLB 1676.

The notation "NRRLB" with respect to the above two organisms indicates the culture of the organism has been placed on deposit with the Northern Utilization Research and Development Division, Department of Agriculture, Peoria, Illinois.

The microbial conversion of niddamycin to 9-dihydroniddamycin is shown in the following equations:

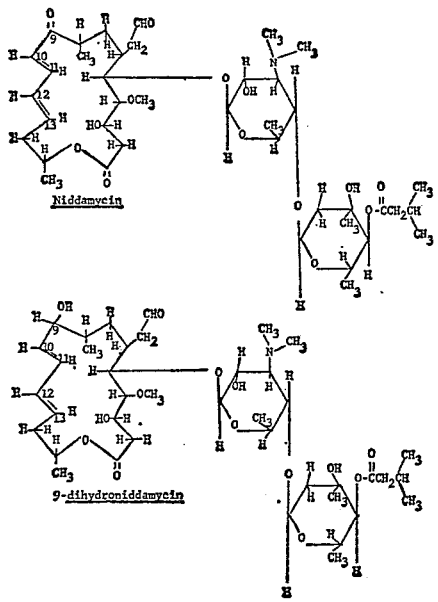

Likewise, the transformation of carbomycin A to 9-dihydrocarbomycin A is shown as follows:

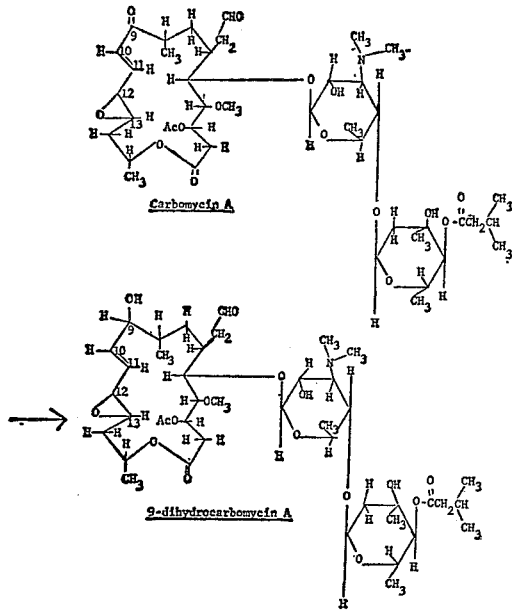

One of the above two microorganisms used in the preparation of 9-dihydroniddamycin or 9-dihydrocarbomycin A is grown in a suitable medium and then the niddamycin or carbomycin A substrate is added. A suitable medium comprises assimilable sources of carbon, nitrogen, defoamers and buffers. Examples of such nitrogen sources include soybean flour, yeast extract, corn meal, oatmeal, meat extracts, distillers' solubles, protein hydrolysates, peptones, amino acids, urea, nitrates, and ammonium compounds. Carbohydrates, especially monosaccharides, can be used as the carbon source and include fructose, sucrose, maltose, lactose, molasses, dextrines and starches.

A typical fermentation medium used is as follows:

Fermentation medium

| Ingredients: | Grams/liter |
|---|---|
| Glucose monohydrate | 50.0 |
| Soybean grits | 5.0 |
| Yeast extract | 2.5 |
| NaCl | 1.0 |
| $K_2HPO_4$ | 2.0 |
| $KH_2PO_4$ | 1.0 |

Adjust pH 7.0 and add deionized water to 1.0 liter.

Essentially then, the microbial conversion method of preparing 9-dihydroniddamycin from a niddamycin substrate or 9-dihydrocarbomycin A from a carbomycin A substrate which comprises the steps of inoculating *Streptomyces albireticuli* NRRLB 1670 or *Streptomyces eurocidicus* NRRLB 1676 cultures into a fermentation medium, incubating for sufficient time to allow growth, adding said niddamycin or carbomycin A substrate to the fermentation reincubating for sufficient time in order to permit the microbial conversion of the substrate to take place, and isolating said 9-dihydroniddamycin or said 9-dihydrocarbomycin A.

The following examples illustrate the process of the invention.

EXAMPLE 1

*Streptomyces albireticuli* NRRLB 1670 or *Streptomyces eurocidicus* NRRLB 1676 were inoculated each from agar slant cultures into separate sterile cotton plugged 500 ml. Erlenmeyer flasks containing 100 ml. of the previously described fermentation medium. The flasks were incubated at 28° C. on a Gump rotary shaker at 250 r.p.m. After 48 hours incubation, 0.05% (50 mg./100 ml. medium) niddamycin was added to each flask. The flasks were reincubated on the shaker and were sampled at various ages during the fermentation for thin-layer chromatography (TLC) analysis as follows: 10 ml. of whole culture was adjusted to pH 8.5 with NH$_4$OH. Ten ml. acetone was added to the sample with shaking. The whole culture-acetone sample was then extracted twice with 20 ml. portions of ethyl acetate. The ethyl acetate extracts were combined and reduced to a residue under vacuum and the residue was extracted with 2.5 ml. of methanol. The methanol solutions were spotted (50 to 200 microliters) on 20 x 20 cm. glass plates coated with Merck-Darmstadt silica gel GF$_{254}$ about 500 microns in thickness. The samples were also spotted on Quantum Q1F prepared silica gel plates. The TCL plates were developed in a solvent system consisting of methylene chloride: 95% aqueous methanol: water (90:10:1) or (85:15:1) for 30 to 45 minutes. After development the TCL plates were dried, viewed and photographed under 254 nm. ultraviolet light. Then the plates were sprayed with anisaldehyde spray reagent (95% ethanol:concentrated H$_2$SO$_4$:anisaldehyde 9:1:1) and then heated in a 100° C. oven for 5–10 minutes. Duplicate TCL plates developed in the same solvent system were dried and placed on large *Bacillus subtilis* seeded agar bioautograph plates. On TCL plates residual niddamycin was visible as a dark absorbing spot on a white background under 254 nm. ultraviolet light at R$_f$ 0.6 and was revealed as a black spot on a white background after spraying with the anisaldehyde spray. Both cultures produced a more polar (slower moving) major microbial conversion product which was only barely discernible under 254 nm. ultarviolet light at R$_f$ 0.45. This product was also revealed as a black spot after spraying the TLC plate with anisaldehyde spray. Like niddamycin, the conversion product inhibited *B. subtilis* on bioautograph plates. The good response with the anisaldehyde spray reagent along with the sharply reduced ultraviolet absorption indicated a possible change in the conjugated system of the molecule. Since both of these cultures are known antibiotic producing species, it is important to note that this particular antibiotic was not formed in the absence of the substrate niddamycin.

EXAMPLE 2

Two hundred sterile cotton plugged 500 ml. Erlenmeyer flasks each containing 100 ml. of sterile previously described fermentation medium were inoculated each with one-half of an agar slant culture of *Streptomyces albireticuli* NRRLB 1670. The flasks were then incubated on a Gump rotary shaker (250 r.p.m.'s) at 28° C. After 48 hours 0.05% (50 mg./100 ml. medium) niddamycin was added to each flask. The flasks were returned to the shaker and further incubated at 28° C. Samples were taken at various ages during the fermentation, and they were extracted, as previously described, for thin-layer chromatography in order to determine optimal yields of the microbial conversion product.

The culture was harvested at the optimal age (120 hr.) and the contents from the flasks were pooled. The pooled harvested whole culture was filtered with Dicalite® and the cake was washed with water. The filtered beer and mycelia Dicalite® cake water wash were combined and concentrated under vacuum at about 30° C. to about one-tenth volume. The concentrated filtered beer was adjusted to pH 8.0 with NH$_4$OH and then extracted five times with one fifth volume of methylene chloride. The methylene chloride extracts were combined, washed with water, clarified by filteration and finally reduced to a residue. The residue was dissolved in methylene chloride:methanol (99:1) and then chromatographed on a silica gel GF$_{254}$ (Merck Darmstadt) column slurry packed in methylene chloride:methanol (99:1). The microbial conversion product, 9-dihydroniddamycin was then eluted from the column with methylene chloride: methanol (94:6). The conversion product fractions were pooled, reduced to residue and this residue was rechromatographed in a similar column eluting with methylene chloride:methanol (97.5:2.5). The 9-dihydroniddamycin fractions were combined, reduced to a residue and dedissolved in the mobile or upper phase of the following solvent system, heptane:benzene:methanol:water (2:2:1:1). A glass column (6 cm. dia.) was half filled with the mobile phase of the solvent system and then packed with 500 gm. of silica gel GF$_{254}$ moistened with the immobile or lower phase (0.9 ml./gm. silica gel). The impure 9-dihydroniddamycin fractions, dissolved in the mobile phase, were added to the column which was then developed with the mobile phase. Pure 9-dihydroniddamycin fractions were collected, pooled and dried.

Physical properties: M.P. 120–122° C. Mass spectrum: Molecular Ion (M)$^+$=785 (calcd. for C$_{40}$H$_{67}$NO$_{14}$ =785).

The 100 MHz. NMR spectrum and the mass spectrum were consistent with the structure of 9-dihydroniddamycin.

EXAMPLE 3

Two hundred sterile cotton plugged 500 ml. Erlenmeyer flasks each containing 100 ml. of sterile previously described fermentation medium were each inoculated with one-half of an agar slant culture of *Streptomyces eurocidicus* NRRLB 1676. The flasks were then incubated on a Gump rotary shaker (250 r.p.m.) at 28° C. After 48 hours, 0.05% (50 mg./100 ml. medium) niddamycin was added to each flask. The flasks were returned to the shaker and incubated at 28° C. Samples were taken at various ages during the fermentation for solvent extraction and thin-layer chromatography analysis to determine peak yields of the microbial conversion product.

The culture was harvested at the optimal age which was from approximately 144 hours. The culture was filtered and the filtered beer extracted with ethyl acetate. The ethyl acetate residue was extracted with methylene chloride. The methylene chloride extracts were combined, reduced to a residue and chromatographed over a similar series of column yielding the pure conversion product identified as a 9-hydroniddamycin and identical to the conversion product produced by *Streptomyces albireticuli* NRRLB 1670 as determined by the 100 MHz. NMR spectrum and the mass spectrum.

EXAMPLE 4

*Streptomyces albireticuli* NRRLB 1670 was inoculated from 7 days incubated agar slant cultures into a series of four sterile cotton plugged 500 ml. Erlenmeyer flasks each containing 100 ml. of sterile, previously described fermentation medium. The inoculated flasks were incubated at 28° C. on a Gump rotary shaker for 48 hours. At that time, 0.05% (50 mg./100 ml. medium) carbomycin A (magnamycin A) was added to each flask in powdered form. The flasks were reincubated on the shaker and were sampled at various ages during the fermentation for thin-layer chromatography (TLC) analysis as follows: 10 ml. of whole culture were adjusted to pH 8.5 with NH$_4$OH. One volume of acetone was then added with shaking. The whole culture-acetone samples were then extracted twice with 20 ml. of ethyl acetate. The ethyl acetate extracts were combined and reduced to a residue under vacuum and the residue was extracted with 2.5 ml. of methanol. The methanol extracts were spotted (50 to 200 microlites) on 20 cm. x 20 cm. glass plates coated with Merck-Darmstadt silica gel GF$_{254}$ about 500 microns in thickness. The solutions were also spotted on Quantum Q1F prepared silica gel plates or Analtech prepared silica gel plates. The thin-layer chromatography plates were then developed in a solvent system consisting of methylene chloride: methanol:water (85:15:1) for 30 to 45 minutes. The carbomycin A standard in this solvent system moved to $R_f$ 0.75, was readily seen with 254 nm. ultraviolet light and revealed as a black spot after spraying with anisaldehyde spray. The major microbial conversion product formed by *Streptomyces albireticuli* NRRLB 1670 was not discernible under 254 nm. ultraviolet light, but was revealed after the anisaldehyde spray as a black spot at $R_f$ 0.50. The lack of or greatly decreased ultraviolet absorption indicated a possible change in the conjugated system. Most of the carbomycin A substrate was utilized.

Since the major microbial conversion product appeared to be well separated from other impurities and products on developed thin-layer chromatography plates, a series of Quantum Q1F prepared silica gel plates was streaked with selected extracted fermentation samples. The TLC plates were developed in the above solvent system and the microbial conversion product was each marked by viewing under 254 nm. ultraviolet light. This area of each plate was then removed and successively eluted with three portions of methanol. The methanol extracts of each sample were combined, filtered through Whatman No. 1 paper, and then concentrated to 2.5 ml. Since the microbial conversion product appeared to be pure by TLC analysis, two samples from different ages in the fermentation were submitted for mass spectrum analysis. The mass spectra confirmed the addition of two protons to the macrolide ring. The ultraviolet spectrum of this product showed loss of the maximum at 235 nm. of carbomycin A. This microbial conversion product also inhibited *Bacillus subtilis*. Since it has been shown previously that *Streptomyces albireticuli* NRRLB–1670 and *Streptomyces eurocidicus* NRRLB–1676 formed 9-dihydroniddamycin from niddamycin, the expected microbial conversion product from carbomycin A was 9-dihydrocarbomycin A. The mass spectra and decreased ultraviolet absorption with loss of 235 nm. maximum of carbomycin A supported this structure.

What is claimed is:

1. A microbial conversion method of preparing 9-dihydroniddamycin from a niddamycin substrate or 9-dihydrocarbomycin A from a carbomycin A substrate which comprises the steps of inoculating *Streptomyces albireticuli* NRRLB 1670 or *Streptomyces eurocidicus* NRRLB 1676 cultures into a fermentation medium and incubating for sufficient time to allow growth, adding said niddamycin or carbomycin A substrate to the fermentation medium, allowing sufficient time in order to permit the conversion to take place, and isolating said 9-dihydroniddamycin or said 9-dihydrocarbomycin A.

2. The method of Claim 1 wherein 9-dihydroniddamycin is produced from niddamycin substrate by means of *Streptomyces albireticuli* NRRLB 1670 culture.

3. The method of Claim 1 wherein 9-dihydroniddamycin is produced from niddamycin substrate by means of *Streptomyces eurocidicus* NRRLB 1670 culture.

4. The method of Claim 1, wherein 9-dihydrocarbomycin A is produced from a carbomycin A substrate by means of *Streptomyces albireticuli* NRRLB 1670 culture.

5. The method of Claim 1 wherein 9-dihydrocarbomycin A is produced from a carbomycin A substrate by means of *Streptomyces eurocidicus* NRRLB 1676 culture.

References Cited
UNITED STATES PATENTS
3,630,846  12/1971  Hata et al. _____ 195—80 R

OTHER REFERENCES

*The Actinomycetes:* S. Waksman; Williams and Wilkins Co., vol. 2, pages 169 and 205, 1961.

Chemical Abstracts; vol. 64, 673d; 1966.

A. LOUIS MONACELL, Primary Examiner

R. J. WARDEN, Assistant Examiner